(12) United States Patent
Saiyed et al.

(10) Patent No.: US 10,320,740 B2
(45) Date of Patent: Jun. 11, 2019

(54) SYSTEMS AND METHODS FOR PERFORMING DUAL DNS LOOKUP TO DETECT PUBLIC VERSUS INTRANET

(71) Applicant: Citrix Systems, Inc., Fort Lauderdale, FL (US)

(72) Inventors: Arif Ali Saiyed, Bangalore (IN); Deepak Ramaswamy, Bangalore (IN); Jinu Joy, Bangalore (IN)

(73) Assignee: Citrix Systems, Inc., Fort Lauderdale, FL (US)

( * ) Notice: Subject to any disclaimer, the term of this patent is extended or adjusted under 35 U.S.C. 154(b) by 608 days.

(21) Appl. No.: 14/712,960

(22) Filed: May 15, 2015

(65) Prior Publication Data

US 2016/0337309 A1   Nov. 17, 2016

(51) Int. Cl.
*H04L 12/46* (2006.01)
*H04L 29/08* (2006.01)
*H04L 29/12* (2006.01)

(52) U.S. Cl.
CPC ...... *H04L 61/1511* (2013.01); *H04L 12/4633* (2013.01); *H04L 67/02* (2013.01); *H04L 61/1552* (2013.01)

(58) Field of Classification Search
USPC .......................................................... 709/217
See application file for complete search history.

(56) References Cited

U.S. PATENT DOCUMENTS

| | | | | |
|---|---|---|---|---|
| 2010/0226372 A1* | 9/2010 | Watanabe | ......... | H04L 29/12066 370/392 |
| 2013/0111066 A1* | 5/2013 | Vempati | .............. | H04L 61/1511 709/245 |
| 2013/0179551 A1* | 7/2013 | Li | ....................... | H04L 63/0272 709/223 |
| 2014/0359041 A1* | 12/2014 | Bai | ..................... | H04L 61/1511 709/207 |
| 2015/0081926 A1* | 3/2015 | White | ................. | H04L 67/1008 709/245 |

* cited by examiner

*Primary Examiner* — Hermon Asres
(74) *Attorney, Agent, or Firm* — Foley & Lardner LLP; Christopher J. McKenna; Paul M. H. Pua

(57) ABSTRACT

The present disclosure is directed towards systems and methods for performing dual domain name system (DNS) lookups to detect whether a request is for a public site versus an intranet site on a private network. A hosted application on a client device on a first network can receive web page content from a second network via a tunnel connection. The hosted application may intercept a request on the client device to access an intranet site on the second network identified by the web page content. An IP address resolution can be performed of a first DNS lookup of sites on the first network and a second DNS lookup can be performed. The hosted application can communicate the request via the tunnel connection to a second device on the second network responsive to determining that the first IP address resolution is different from the second IP address resolution.

16 Claims, 8 Drawing Sheets

SYSTEMS AND METHODS FOR PERFORMING DUAL DNS LOOKUP TO DETECT PUBLIC VERSUS INTRANET

FIELD

The present application generally relates to data communication networks. In particular, the present application relates to systems and methods for performing dual DNS lookups to detect whether a request is for a public site or an intranet site.

BACKGROUND

A large and growing amount of information is communicated between computing devices over mobile telephone and other communication networks. This information consumes bandwidth and other resources. Further, operating systems of mobile devices can be very restrictive in nature and routing of information communicated through these networks can slow down, delay, or prevent communications through a network.

BRIEF SUMMARY

The present disclosure is directed towards systems and methods for performing dual domain name system (DNS) lookups to detect whether a request from an in-application browser is for a public site versus an intranet site on a private network. A client device can be connected to a private network such as a corporate large area network (LAN) to access a user's desktop on a remote device in the private network. The client device can establish a secure connection to the private network using a hosted application installed on the client device. However, the client device may want to limit traffic on the secure connection to those requests specifically for intranet sites on the private network and redirect other requests, such as requests for public sites, using a different browser on the client device.

When a request for a web page is received using an application browser within the hosted application, a DNS lookup can be performed at both sides of the connection, the client device side and the server side executing on the private network. The results of both DNS lookups can be used to determine if the request is for a public site versus an intranet site on the private network. For example, if both lookups resolve to same IP address, the hosted application may determine that the request is for a public site. The hosted application may redirect the request to use a different browser on the client device to handle the request for the public site, and save bandwidth on the secure connection to the server on the private network. If both DNS lookups resolve to different IP addresses, the hosted application may determine that the request is for an intranet site on the private network and communicate the request to a second device on the private network using the secure connection.

In one aspect, the present disclosure is directed to a method for performing dual DNS lookup to detect a request for a public site versus a request for an intranet site. The method includes a hosted application, on a client device on a first network, receiving web page content from a second network via a tunnel connection. The web page content may identify intranet sites on the second network. The hosted application may intercept a request on the client device to access an intranet site on the second network identified by the web page content. A first IP address resolution of a first DNS lookup of sites on the first network can be performed by the hosted application. The hosted application may receive a second IP address resolution of a second DNS lookup performed by a second device on the second network via the tunnel connection. The hosted application can communicate the intercepted request via the tunnel connection to the second device on the second network responsive to determining that the first IP address resolution is different from the second IP address resolution.

In some embodiments, the method includes the hosted application establishing a secure connection to the second device on the second network using the tunnel connection. The hosted application may trap the request made from an application browser executing on the client device and within the hosted application and transmit the request to the second device on the second network via the tunnel connection. In some embodiments, the second device on the second network performs the second IP address resolution of the second DNS lookup on the second network using the request. The hosted application may determine that the request does not correspond to at least one site on the first network. The hosted application may provide access for an application browser on the client device to an intranet website on the second network using the tunnel connection. The intranet website corresponding to the request.

In some embodiment, the hosted application intercepts a second request from an application browser executing on the client device and within the hosted application. The hosted application can perform a third IP address resolution of a third DNS lookup of sites on the first network based on the second request and receive a fourth IP address resolution of a fourth DNS lookup performed by the second device on the second network via the tunnel connection based on the second request. The hosted application may redirect the second request to a browser executing on the client device and not through the hosted application. In some embodiments, the hosted application compares results of the first IP address resolution of the first DNS lookup to results of the second IP address resolution of the second DNS lookup. The hosted application may determine whether the request is for an external site or an intranet site on the second network based on the comparison. In some embodiments, the hosted application redirects the request responsive to determining that the request is for the external site and at least one site in the results of the first IP address resolution of the first DNS lookup matches at least one site in the results of the second IP address resolution of the second DNS lookup.

In another aspect, the present disclosure is directed to a system for performing dual DNS lookup to detect a request for a public site versus a request for an intranet site. The system includes a hosted application executing on a client device on a first network. The hosted application can be configured to receive web page content from a second network via a tunnel connection. The web page content may identify intranet sites on the second network. The hosted application can be configured to intercept a request on the client device to access an intranet site on the second network identified by the web page content and perform a first IP address resolution of a first DNS lookup of sites on the first network. The hosted application can be configured to receive a second IP address resolution of a second DNS lookup performed by a second device on the second network via the tunnel connection and communicate the intercepted request via the tunnel connection to the second device on the second network responsive to determining that the first IP address resolution is different from the second IP address resolution.

In some embodiments, the hosted application is configured to establish a secure connection to the second device on the second network using the tunnel connection. The hosted application can be configured to trap the request made from an application browser executing on the client device and within the hosted application and transmit the request to the second device on the second network via the tunnel connection. The second device on the second domain can be configured to perform the second IP address resolution of the second DNS lookup on the second network using the request.

In some embodiments, the hosted application can be configured to determine that the request does not correspond to at least one site on the first network. The hosted application can be configured to provide access for an application browser on the client device to an intranet website on the second network using the tunnel connection, the intranet website corresponding to the request. In some embodiments, the hosted application is configured to intercept a second request from an application browser executing on the client device and within the hosted application. The hosted application can be configured to perform a third IP address resolution of a third DNS lookup of sites on the first network based on the second request and receive a fourth IP address resolution of a fourth DNS lookup performed by the second device on the second network via the tunnel connection based on the second request. The hosted application may redirect the second request to a browser executing on the client device and not through the hosted application. The details of various embodiments of the invention are set forth in the accompanying drawings and the description below.

BRIEF DESCRIPTION OF THE FIGURES

The foregoing and other objects, aspects, features, and advantages of the invention will become more apparent and better understood by referring to the following description taken in conjunction with the accompanying drawings, in which.

Figure 1A:
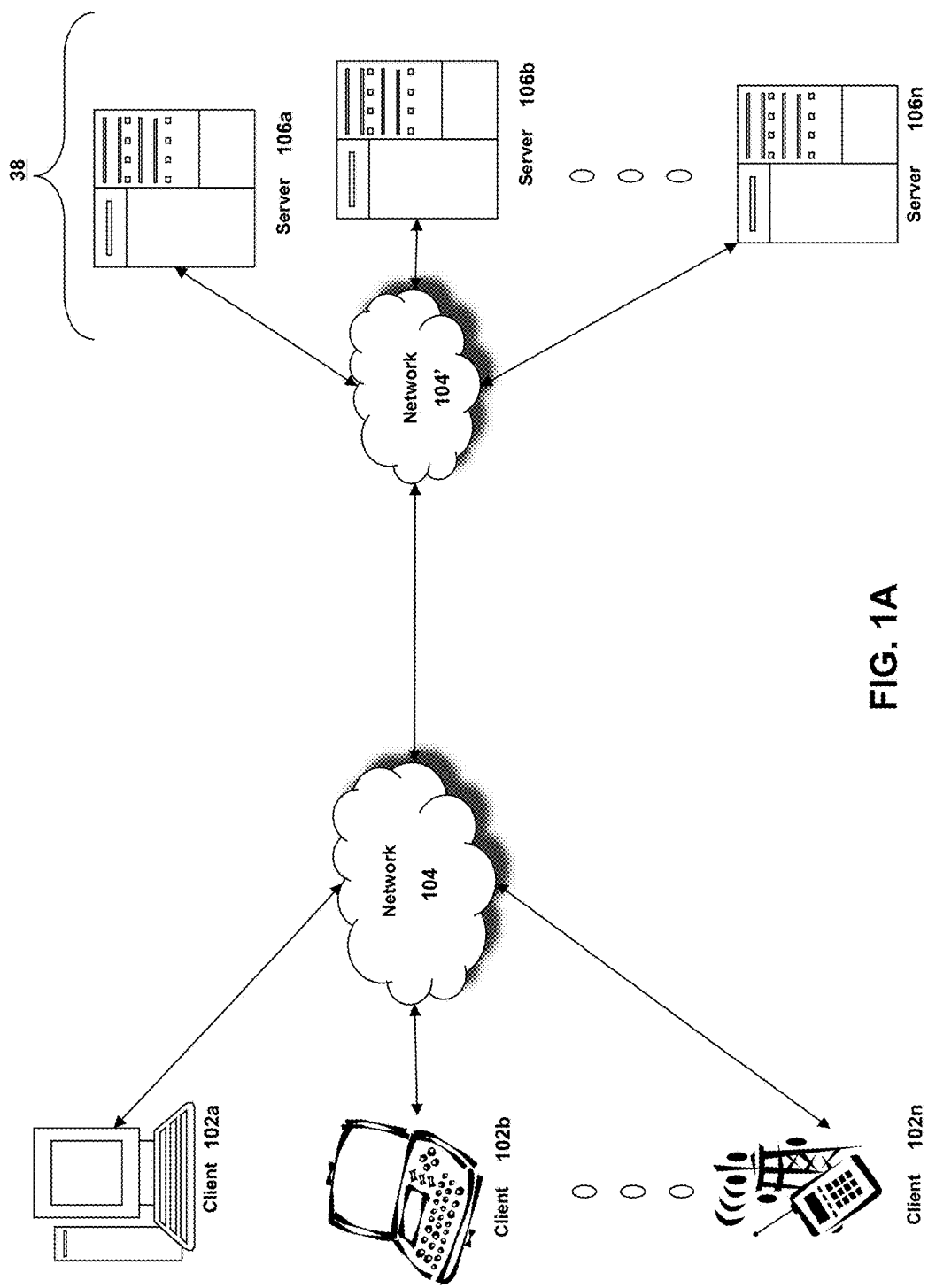
FIG. 1A is a block diagram of an embodiment of a network environment for a client to access a server via an appliance.
Figure 1B:
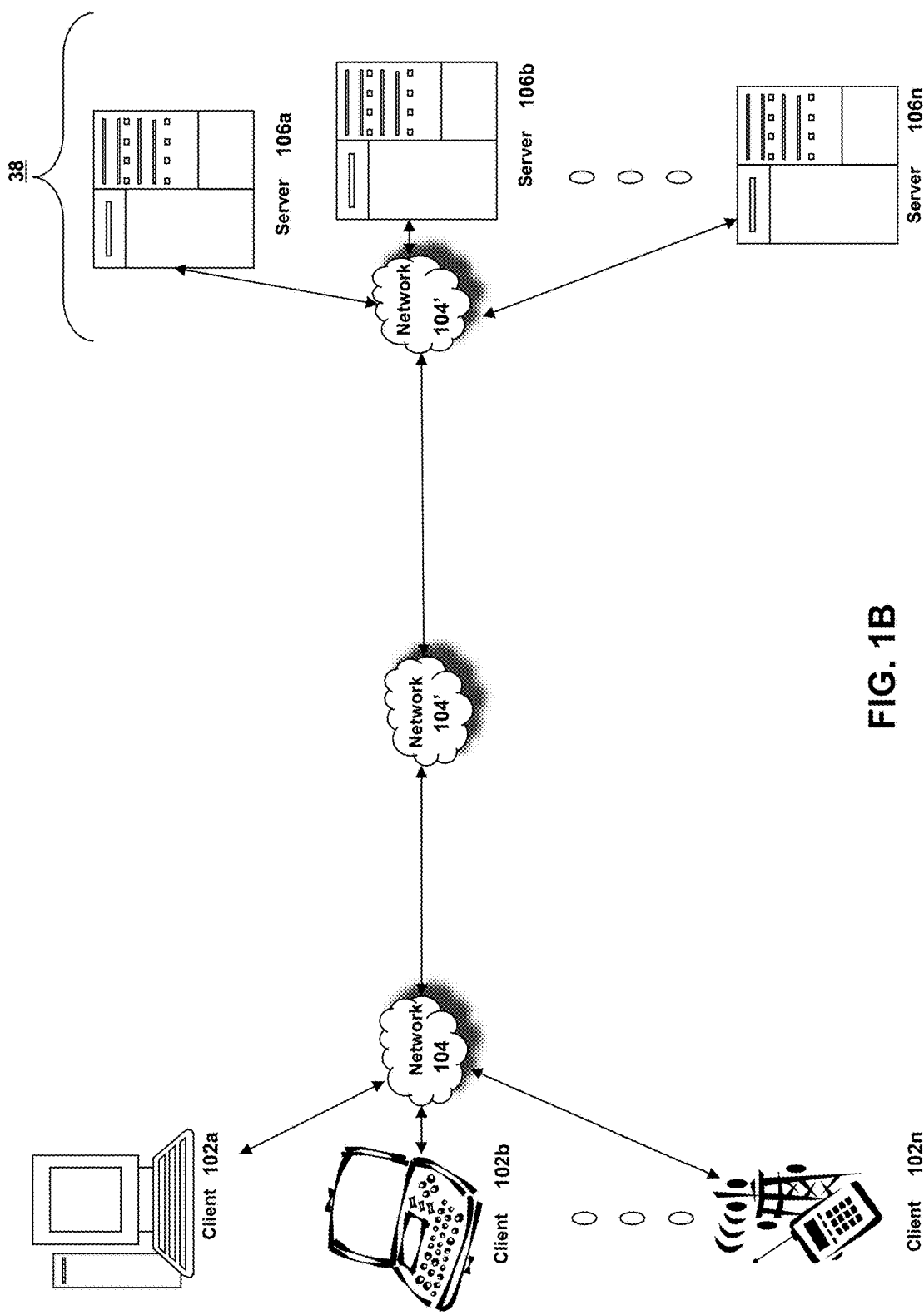
FIG. 1B is a block diagram of an embodiment of an environment for delivering a computing environment from a server to a client via an appliance.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

For purposes of reading the description of the various embodiments below, the following descriptions of the sections of the specification and their respective contents may be helpful:

Section A describes a network environment and computing environment which may be useful for practicing embodiments described herein;

Section B describes embodiments of systems and methods for performing dual DNS lookup to detect a request for a public site versus a request for an intranet site.

A. Network and Computing Environment

Prior to discussing the specifics of embodiments of the systems and methods of an appliance and/or client, it may be helpful to discuss the network and computing environments in which such embodiments may be deployed. Referring now to FIG. 1A, an embodiment of a network environment is depicted. In brief overview, the network environment comprises one or more clients 102a-102n (also generally referred to as local machine(s) 102, or client(s) 102) in communication with one or more servers 106a-106n (also generally referred to as server(s) 106, or remote machine(s) 106) via one or more networks 104, 104' (generally referred to as network 104). In some embodiments, a client 102 communicates with a server 106.

Although FIG. 1A shows a network 104 and a network 104' between the clients 102 and the servers 106, the clients 102 and the servers 106 may be on the same network 104. The networks 104 and 104' can be the same type of network or different types of networks. The network 104 and/or the network 104' can be a local-area network (LAN), such as a company Intranet, a metropolitan area network (MAN), or a wide area network (WAN), such as the Internet or the World Wide Web. In one embodiment, network 104' may be a private network and network 104 may be a public network. In some embodiments, network 104 may be a private network and network 104' a public network. In another embodiment, networks 104 and 104' may both be private networks. In some embodiments, clients 102 may be located at a branch office of a corporate enterprise communicating via a WAN connection over the network 104 to the servers 106 located at a corporate data center.

The network 104 and/or 104' be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network 104 may comprise a wireless link, such as an infrared channel or satellite band. The topology of the network 104 and/or 104' may be a bus, star, or ring network topology. The network 104 and/or 104' and network topology may be of any such network or network topology as known to those ordinarily skilled in the art capable of supporting the operations described herein.

In one embodiment, the system may include multiple, logically-grouped servers 106. In these embodiments, the logical group of servers may be referred to as a server farm 38. In some of these embodiments, the serves 106 may be geographically dispersed. In some cases, a farm 38 may be administered as a single entity. In other embodiments, the server farm 38 comprises a plurality of server farms 38. In one embodiment, the server farm executes one or more applications on behalf of one or more clients 102.

The servers 106 within each farm 38 can be heterogeneous. One or more of the servers 106 can operate according to one type of operating system platform (e.g., WINDOWS NT, manufactured by Microsoft Corp. of Redmond, Wash.), while one or more of the other servers 106 can operate on according to another type of operating system platform (e.g., Unix or Linux). The servers 106 of each farm 38 do not need to be physically proximate to another server 106 in the same farm 38. Thus, the group of servers 106 logically grouped as a farm 38 may be interconnected using a wide-area network (WAN) connection or medium-area network (MAN) connection. For example, a farm 38 may include servers 106 physically located in different continents or different regions of a continent, country, state, city, campus, or room. Data transmission speeds between servers 106 in the farm 38 can be increased if the servers 106 are connected using a local-area network (LAN) connection or some form of direct connection.

Servers 106 may be referred to as a file server, application server, web server, proxy server, or gateway server. In some embodiments, a server 106 may have the capacity to function as either an application server or as a master application server. In one embodiment, a server 106 may include an Active Directory. The clients 102 may also be referred to as client nodes or endpoints. In some embodiments, a client 102 has the capacity to function as both a client node seeking access to applications on a server and as an application server providing access to hosted applications for other clients 102a-102n.

In some embodiments, a client 102 communicates with a server 106. In one embodiment, the client 102 communicates directly with one of the servers 106 in a farm 38. In another embodiment, the client 102 executes a program neighborhood application to communicate with a server 106 in a farm 38. In still another embodiment, the server 106 provides the functionality of a master node. In some embodiments, the client 102 communicates with the server 106 in the farm 38 through a network 104. Over the network 104, the client 102 can, for example, request execution of various applications hosted by the servers 106a-106n in the farm 38 and receive output of the results of the application execution for display. In some embodiments, only the master node provides the functionality required to identify and provide address information associated with a server 106' hosting a requested application.

In one embodiment, the server 106 provides functionality of a web server. In another embodiment, the server 106a receives requests from the client 102, forwards the requests to a second server 106b and responds to the request by the client 102 with a response to the request from the server 106b. In still another embodiment, the server 106 acquires an enumeration of applications available to the client 102 and address information associated with a server 106 hosting an application identified by the enumeration of applications. In yet another embodiment, the server 106 presents the response to the request to the client 102 using a web interface. In one embodiment, the client 102 communicates directly with the server 106 to access the identified application. In another embodiment, the client 102 receives application output data, such as display data, generated by an execution of the identified application on the server 106.

Figure 1C:
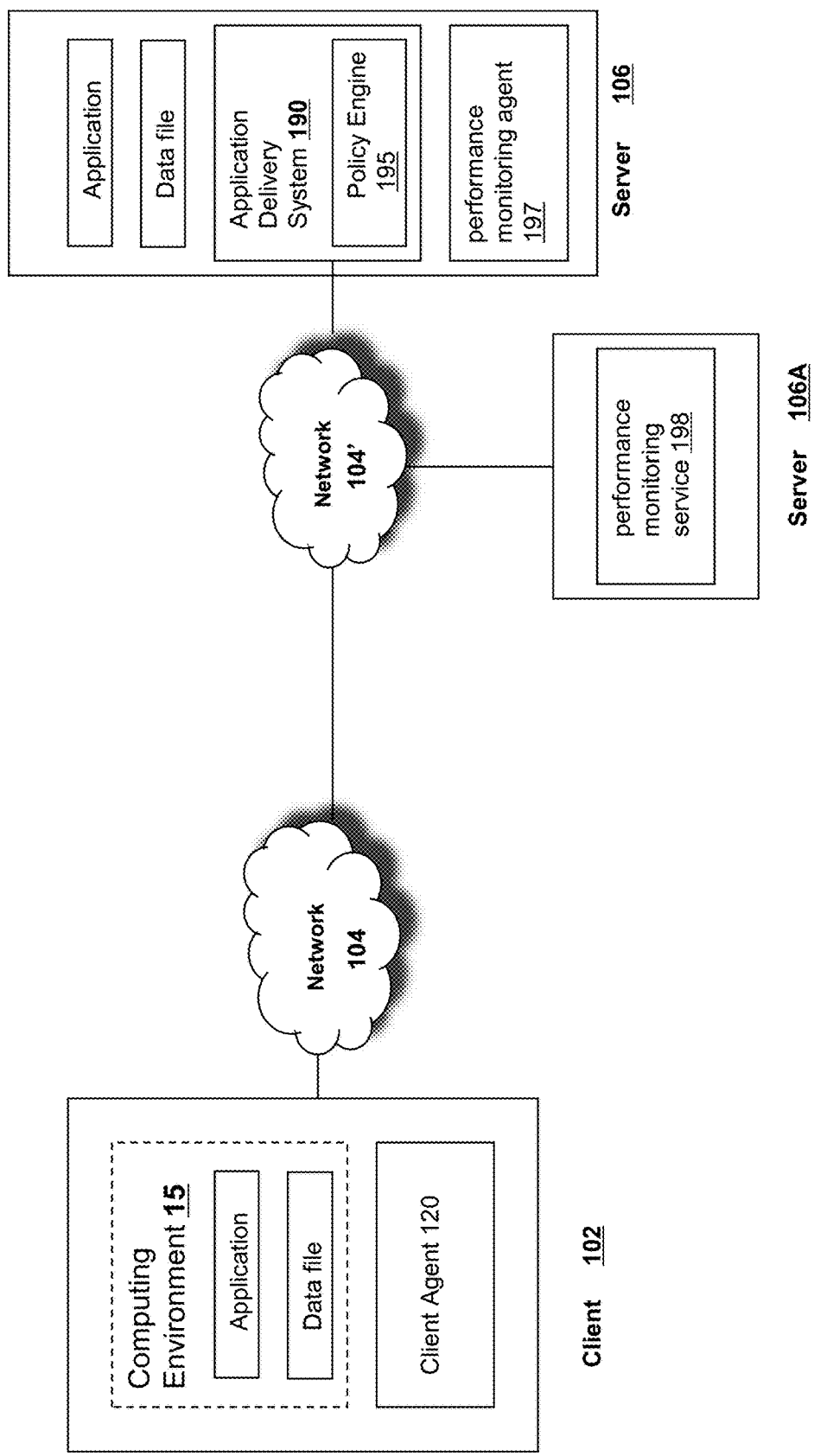
FIG. 1C is a block diagram of another embodiment of an environment for delivering a computing environment from a server to a client via an appliance.

Referring now to FIG. 1C, a network environment for delivering and/or operating a computing environment on a client 102 is depicted. In some embodiments, a server 106 includes an application delivery system 190 for delivering a computing environment or an application and/or data file to one or more clients 102. In brief overview, a client 10 is in communication with a server 106 via network 104, 104.' For example, the client 102 may reside in a remote office of a company, e.g., a branch office, and the server 106 may reside at a corporate data center. The client 102 comprises a client agent 120, and a computing environment 15. The computing environment 15 may execute or operate an application that accesses, processes or uses a data file. The computing environment 15, application and/or data file may be delivered via the server 106.

In some embodiments, the application delivery management system 190 provides application delivery techniques to deliver a computing environment to a desktop of a user, remote or otherwise, based on a plurality of execution methods and based on any authentication and authorization policies applied via a policy engine 195. With these techniques, a remote user may obtain a computing environment and access to server stored applications and data files from any network connected device 100. In one embodiment, the application delivery system 190 may reside or execute on a server 106. In another embodiment, the application delivery system 190 may reside or execute on a plurality of servers 106a-106n. In some embodiments, the application delivery system 190 may execute in a server farm 38. In one embodiment, the server 106 executing the application delivery system 190 may also store or provide the application and data file. In another embodiment, a first set of one or more servers 106 may execute the application delivery system 190, and a different server 106n may store or provide the application and data file. In some embodiments, each of the application delivery system 190, the application, and data file may reside or be located on different servers.

The client 102 may include a computing environment 15 for executing an application that uses or processes a data file. The client 102 via networks 104, 104' may request an application and data file from the server 106. For example, the client 102 may not have the application and data file stored or accessible locally. In response to the request, the application delivery system 190 and/or server 106 may deliver the application and data file to the client 102. For example, in one embodiment, the server 106 may transmit the application as an application stream to operate in computing environment 15 on client 102.

In some embodiments, the application delivery system 190 comprises any portion of the Citrix Access Suite™ by Citrix Systems, Inc., such as the MetaFrame or Citrix Presentation Server™ and/or any of the Microsoft® Windows Terminal Services manufactured by the Microsoft Corporation. In one embodiment, the application delivery system 190 may deliver one or more applications to clients 102 or users via a remote-display protocol or otherwise via remote-based or server-based computing. In another embodiment, the application delivery system 190 may deliver one or more applications to clients or users via steaming of the application.

In one embodiment, the application delivery system 190 includes a policy engine 195 for controlling and managing the access to, selection of application execution methods and the delivery of applications. In some embodiments, the policy engine 195 determines the one or more applications a user or client 102 may access. In another embodiment, the policy engine 195 determines how the application should be delivered to the user or client 102, e.g., the method of execution. In some embodiments, the application delivery system 190 provides a plurality of delivery techniques from which to select a method of application execution, such as a server-based computing, streaming or delivering the application locally to the client 120 for local execution.

In one embodiment, a client 102 requests execution of an application program and the application delivery system 190 comprising a server 106 selects a method of executing the application program. In some embodiments, the server 106 receives credentials from the client 102. In another embodiment, the server 106 receives a request for an enumeration of available applications from the client 102. In one embodiment, in response to the request or receipt of credentials, the application delivery system 190 enumerates a plurality of application programs available to the client 102. The application delivery system 190 receives a request to execute an enumerated application. The application delivery system 190 selects one of a predetermined number of methods for executing the enumerated application, for example, responsive to a policy of a policy engine. The application delivery system 190 may select a method of execution of the application enabling the client 102 to receive application-output data generated by execution of the application program on a server 106. The application delivery system 190 may select a method of execution of the application enabling the local machine 10 to execute the application program locally after retrieving a plurality of application files comprising the application. In yet another embodiment, the application delivery system 190 may select a method of execution of the application to stream the application via the network 104 to the client 102.

A client 102 may execute, operate or otherwise provide an application, which can be any type and/or form of software, program, or executable instructions such as any type and/or form of web browser, web-based client, client-server application, a thin-client computing client, an ActiveX control, or a Java applet, or any other type and/or form of executable instructions capable of executing on client 102. In some embodiments, the application may be a server-based or a remote-based application executed on behalf of the client 102 on a server 106. In one embodiments the server 106 may display output to the client 102 using any thin-client or remote-display protocol, such as the Independent Computing Architecture (ICA) protocol manufactured by Citrix Systems, Inc. of Ft. Lauderdale, Fla. or the Remote Desktop Protocol (RDP) manufactured by the Microsoft Corporation of Redmond, Wash. The application can use any type of protocol and it can be, for example, an HTTP client, an FTP client, an Oscar client, or a Telnet client. In other embodiments, the application comprises any type of software related to VoIP communications, such as a soft IP telephone. In further embodiments, the application comprises any application related to real-time data communications, such as applications for streaming video and/or audio.

In some embodiments, the server 106 or a server farm 38 may be running one or more applications, such as an application providing a thin-client computing or remote display presentation application. In one embodiment, the server 106 or server farm 38 executes as an application, any portion of the Citrix Access Suite™ by Citrix Systems, Inc., such as the MetaFrame or Citrix Presentation Server™, and/or any of the Microsoft® Windows Terminal Services manufactured by the Microsoft Corporation. In one embodiment, the application is an ICA client, developed by Citrix Systems, Inc. of Fort Lauderdale, Fla. In other embodiments, the application includes a Remote Desktop (RDP) client, developed by Microsoft Corporation of Redmond, Wash. Also, the server 106 may run an application, which for example, may be an application server providing email services such as Microsoft Exchange manufactured by the Microsoft Corporation of Redmond, Wash., a web or Internet server, or a desktop sharing server, or a collaboration server. In some embodiments, any of the applications may comprise any type of hosted service or products, such as GoToMeeting™ provided by Citrix Online Division, Inc. of Santa Barbara, Calif., WebEx™ provided by WebEx, Inc. of Santa Clara, Calif., or Microsoft Office Live Meeting provided by Microsoft Corporation of Redmond, Wash.

Still referring to FIG. 1C, an embodiment of the network environment may include a monitoring server 106A. The monitoring server 106A may include any type and form performance monitoring service 198. The performance monitoring service 198 may include monitoring, measurement and/or management software and/or hardware, including data collection, aggregation, analysis, management and reporting. In one embodiment, the performance monitoring service 198 includes one or more monitoring agents 197. The monitoring agent 197 includes any software, hardware or combination thereof for performing monitoring, measurement and data collection activities on a device, such as a client 102, server 106. In some embodiments, the monitoring agent 197 includes any type and form of script, such as Visual Basic script, or Javascript. In one embodiment, the monitoring agent 197 executes transparently to any application and/or user of the device. In some embodiments, the monitoring agent 197 is installed and operated unobtrusively to the application or client. In yet another embodiment, the monitoring agent 197 is installed and operated without any instrumentation for the application or device.

In some embodiments, the monitoring agent 197 monitors, measures and collects data on a predetermined frequency. In other embodiments, the monitoring agent 197 monitors, measures and collects data based upon detection of any type and form of event. For example, the monitoring agent 197 may collect data upon detection of a request for a web page or receipt of an HTTP response. In another example, the monitoring agent 197 may collect data upon detection of any user input events, such as a mouse click. The monitoring agent 197 may report or provide any monitored, measured or collected data to the monitoring service 198. In one embodiment, the monitoring agent 197 transmits information to the monitoring service 198 according to a schedule or a predetermined frequency. In another embodiment, the monitoring agent 197 transmits information to the monitoring service 198 upon detection of an event.

In some embodiments, the monitoring service 198 and/or monitoring agent 197 performs monitoring and performance measurement of any network resource or network infrastructure element, such as a client, server, server farm, or network connection. In one embodiment, the monitoring service 198 and/or monitoring agent 197 performs monitoring and performance measurement of any transport layer connection, such as a TCP or UDP connection. In another embodiment, the monitoring service 198 and/or monitoring agent 197 monitors and measures network latency. In yet one embodiment, the monitoring service 198 and/or monitoring agent 197 monitors and measures bandwidth utilization.

In other embodiments, the monitoring service 198 and/or monitoring agent 197 monitors and measures end-user response times. In some embodiments, the monitoring service 198 performs monitoring and performance measurement of an application. In another embodiment, the monitoring service 198 and/or monitoring agent 197 performs monitoring and performance measurement of any session or connection to the application. In one embodiment, the monitoring service 198 and/or monitoring agent 197 monitors and measures performance of a browser. In another embodiment, the monitoring service 198 and/or monitoring agent 197 monitors and measures performance of HTTP based transactions. In some embodiments, the monitoring service 198 and/or monitoring agent 197 monitors and measures performance of a Voice over IP (VoIP) application or session. In other embodiments, the monitoring service 198 and/or monitoring agent 197 monitors and measures performance of a remote display protocol application, such as an ICA client or RDP client. In yet another embodiment, the monitoring service 198 and/or monitoring agent 197 monitors and measures performance of any type and form of streaming media. In still a further embodiment, the monitoring service 198 and/or monitoring agent 197 monitors and measures performance of a hosted application or a Software-As-A-Service (SaaS) delivery model.

In some embodiments, the monitoring service 198 and/or monitoring agent 197 performs monitoring and performance measurement of one or more transactions, requests or responses related to application. In other embodiments, the monitoring service 198 and/or monitoring agent 197 monitors and measures any portion of an application layer stack, such as any .NET or J2EE calls. In one embodiment, the monitoring service 198 and/or monitoring agent 197 monitors and measures database or SQL transactions. In yet another embodiment, the monitoring service 198 and/or monitoring agent 197 monitors and measures any method, function or application programming interface (API) call.

In some embodiments, the monitoring service 198 and/or monitoring agent 197 monitors and measures performance of delivery of a virtualized application. In other embodiments, the monitoring service 198 and/or monitoring agent 197 monitors and measures performance of delivery of a streaming application. In another embodiment, the monitoring service 198 and/or monitoring agent 197 monitors and measures performance of delivery of a desktop application to a client and/or the execution of the desktop application on the client. In another embodiment, the monitoring service 198 and/or monitoring agent 197 monitors and measures performance of a client/server application.

In one embodiment, the monitoring service 198 and/or monitoring agent 197 is designed and constructed to provide application performance management for the application delivery system 190. For example, the monitoring service 198 and/or monitoring agent 197 may monitor, measure and manage the performance of the delivery of applications via the Citrix Presentation Server. In this example, the monitoring service 198 and/or monitoring agent 197 monitors individual ICA sessions. The monitoring service 198 and/or monitoring agent 197 may measure the total and per session system resource usage, as well as application and networking performance. The monitoring service 198 and/or monitoring agent 197 may identify the active servers for a given user and/or user session. In some embodiments, the monitoring service 198 and/or monitoring agent 197 monitors back-end connections between the application delivery system 190 and an application and/or database server. The monitoring service 198 and/or monitoring agent 197 may measure network latency, delay and volume per user-session or ICA session.

In some embodiments, the monitoring service 198 and/or monitoring agent 197 measures and monitors memory usage for the application delivery system 190, such as total memory usage, per user session and/or per process. In other embodiments, the monitoring service 198 and/or monitoring agent 197 measures and monitors CPU usage the application delivery system 190, such as total CPU usage, per user session and/or per process. In another embodiments, the monitoring service 198 and/or monitoring agent 197 measures and monitors the time required to log-in to an application, a server, or the application delivery system, such as Citrix Presentation Server. In one embodiment, the monitoring service 198 and/or monitoring agent 197 measures and monitors the duration a user is logged into an application, a server, or the application delivery system 190. In some embodiments, the monitoring service 198 and/or monitoring agent 197 measures and monitors active and inactive session counts for an application, server or application delivery system session. In yet another embodiment, the monitoring service 198 and/or monitoring agent 197 measures and monitors user session latency.

In yet further embodiments, the monitoring service 198 and/or monitoring agent 197 measures and monitors measures and monitors any type and form of server metrics. In one embodiment, the monitoring service 198 and/or monitoring agent 197 measures and monitors metrics related to system memory, CPU usage, and disk storage. In another embodiment, the monitoring service 198 and/or monitoring agent 197 measures and monitors metrics related to page faults, such as page faults per second. In other embodiments, the monitoring service 198 and/or monitoring agent 197 measures and monitors round-trip time metrics. In yet another embodiment, the monitoring service 198 and/or monitoring agent 197 measures and monitors metrics related to application crashes, errors and/or hangs.

In some embodiments, the monitoring service 198 and monitoring agent 198 includes any of the product embodiments referred to as EdgeSight manufactured by Citrix Systems, Inc. of Ft. Lauderdale, Fla. In another embodiment, the performance monitoring service 198 and/or monitoring agent 198 includes any portion of the product embodiments referred to as the TrueView product suite manufactured by the Symphoniq Corporation of Palo Alto, Calif. In one embodiment, the performance monitoring service 198 and/or monitoring agent 198 includes any portion of the product embodiments referred to as the TeaLeaf CX product suite manufactured by the TeaLeaf Technology Inc. of San Francisco, Calif. In other embodiments, the performance monitoring service 198 and/or monitoring agent 198 includes any portion of the business service management products, such as the BMC Performance Manager and Patrol products, manufactured by BMC Software, Inc. of Houston, Tex.

Figure 1D:
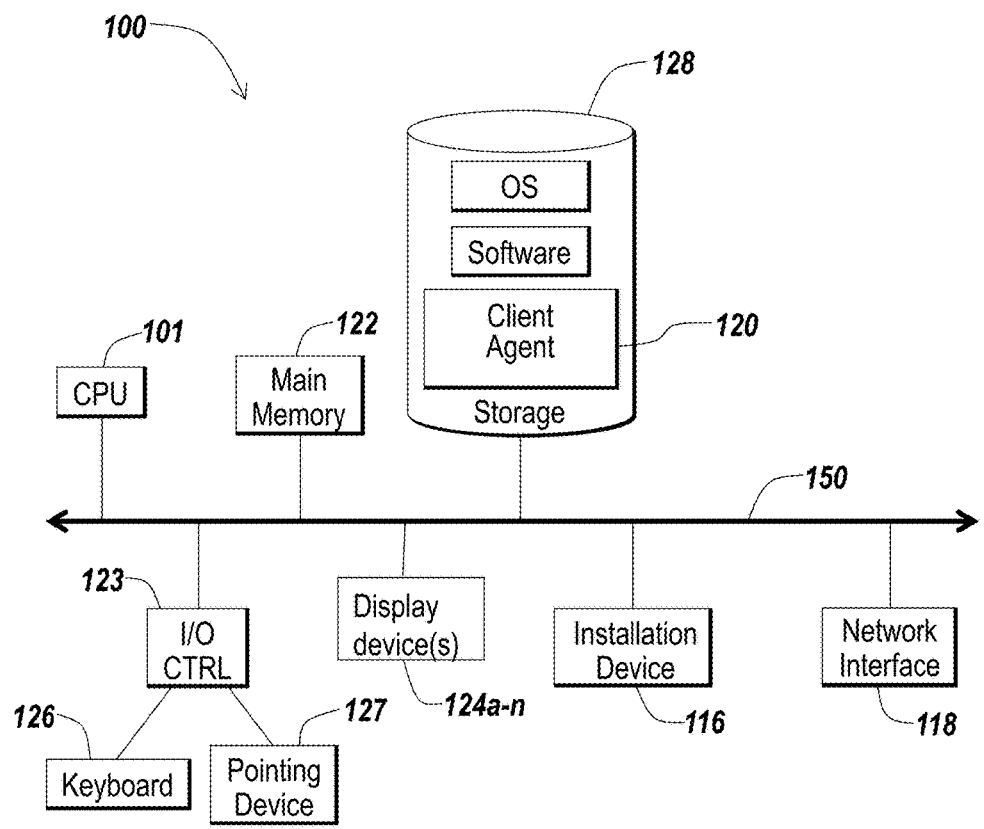
FIGS. 1D-1G are block diagrams of embodiments of a computing device.
Figure 1E:
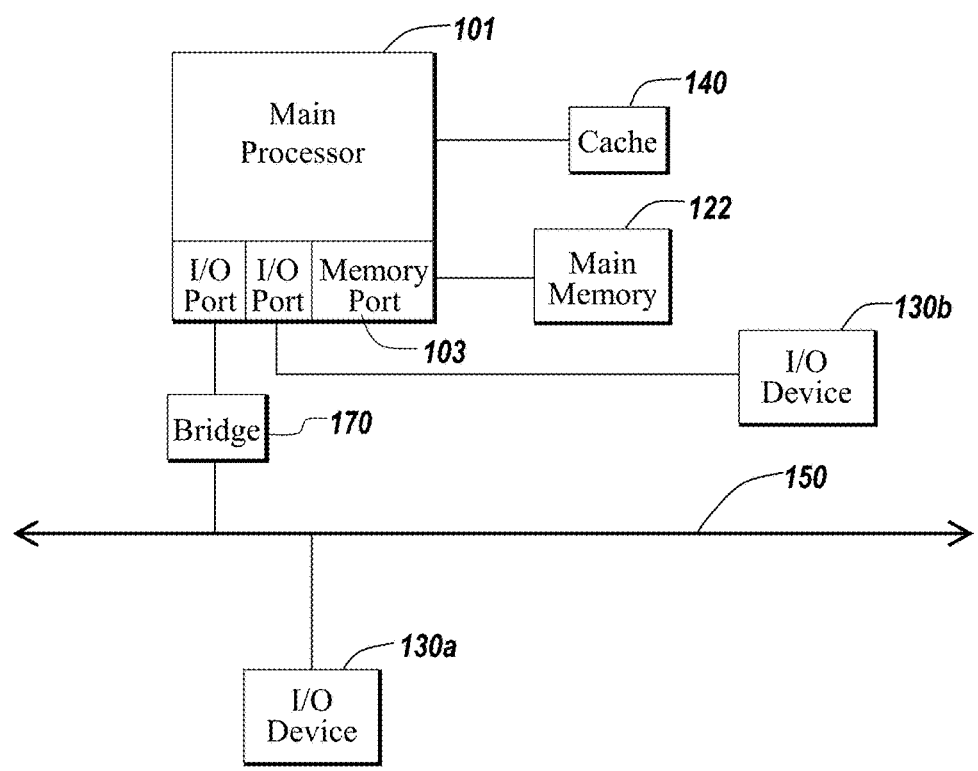
Figure 1F:
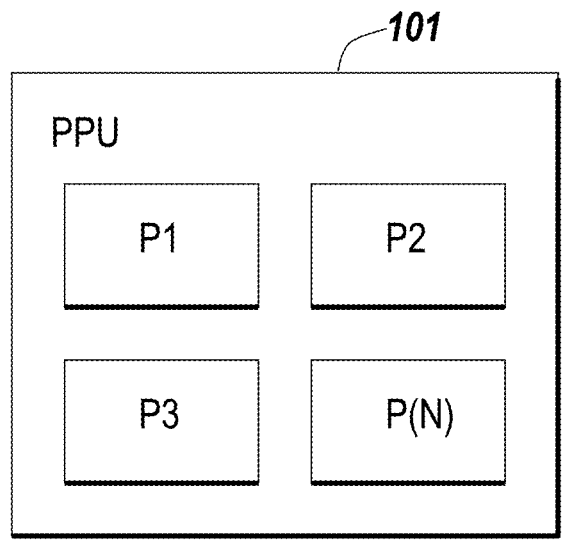
Figure 1G:
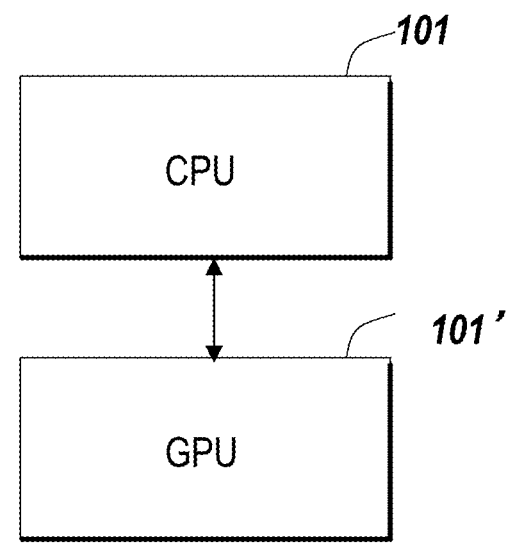

The client 102, server 106, may be deployed as and/or executed on any type and form of computing device, such as a computer, network device or appliance capable of communicating on any type and form of network and performing the operations described herein. FIGS. 1E and 1F depict block diagrams of a computing device 100 useful for practicing an embodiment of the client 102, server 106. As shown in FIGS. 1E and 1F, each computing device 100 includes a central processing unit 101, and a main memory unit 122. As shown in FIG. 1D, a computing device 100 may include a visual display device 124, a keyboard 126 and/or a pointing device 127, such as a mouse. Each computing device 100 may also include additional optional elements, such as one or more input/output devices 130a-130b (generally referred to using reference numeral 130), and a cache memory 140 in communication with the central processing unit 101.

The central processing unit 101 is any logic circuitry that responds to and processes instructions fetched from the main memory unit 122. In many embodiments, the central processing unit is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; the RS/6000 processor, those manufactured by International Business Machines of White Plains, N.Y.; or those manufactured by Advanced Micro Devices of Sunnyvale, Calif. The computing device 100 may be based on any of these processors, or any other processor capable of operating as described herein.

Main memory unit 122 may be one or more memory chips capable of storing data and allowing any storage location to be directly accessed by the microprocessor 101, such as Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 122 may be based on any of the above described memory chips, or any other available memory chips capable of operating as described herein. In the embodiment shown in FIG. 1D, the processor 101 communicates with main memory 122 via a system bus 150 (described in more detail below). FIG. 1E depicts an embodiment of a computing device 100 in which the processor communicates directly with main memory 122 via a memory port 103. For example, in FIG. 1E the main memory 122 may be DRDRAM.

FIG. 1E depicts an embodiment in which the main processor 101 communicates directly with cache memory 140 via a secondary bus, sometimes referred to as a backside bus. In other embodiments, the main processor 101 communicates with cache memory 140 using the system bus 150. Cache memory 140 typically has a faster response time than main memory 122 and is typically provided by SRAM, BSRAM, or EDRAM. In the embodiment shown in FIG. 1E, the processor 101 communicates with various I/O devices 130 via a local system bus 150. Various busses may be used to connect the central processing unit 101 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 101 may use an Advanced Graphics Port (AGP) to communicate with the display 124. FIG. 1E depicts an embodiment of a computer 100 in which the main processor 101 communicates directly with I/O device 130b via HyperTransport, Rapid I/O, or InfiniBand. FIG. 1E also depicts an embodiment in which local busses and direct communication are mixed: the processor 101 communicates with I/O device 130b using a local interconnect bus while communicating with I/O device 130a directly.

The computing device 100 may support any suitable installation device 116, such as a floppy disk drive for receiving floppy disks such as 3.5-inch, 5.25-inch disks or ZIP disks, a CD-ROM drive, a CD-R/RW drive, a DVD-ROM drive, tape drives of various formats, USB device, hard-drive or any other device suitable for installing software and programs such as any client agent 120, or portion thereof. The computing device 100 may further comprise a storage device 128, such as one or more hard disk drives or redundant arrays of independent disks, for storing an operating system and other related software, and for storing application software programs such as any program related to the client agent 120. Optionally, any of the installation devices 116 could also be used as the storage device 128. Additionally, the operating system and the software can be run from a bootable medium, for example, a bootable CD, such as KNOPPIX®, a bootable CD for GNU/Linux that is available as a GNU/Linux distribution from knoppix.net.

Furthermore, the computing device 100 may include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, or some combination of any or all of the above. The network interface 118 may comprise a built-in network adapter, network interface card, PCMCIA network card, card bus network adapter, wireless network adapter, USB network adapter, modem or any other device suitable for interfacing the computing device 100 to any type of network capable of communication and performing the operations described herein.

A wide variety of I/O devices 130a-130n may be present in the computing device 100. Input devices include keyboards, mice, trackpads, trackballs, microphones, and drawing tablets. Output devices include video displays, speakers, inkjet printers, laser printers, and dye-sublimation printers. The I/O devices 130 may be controlled by an I/O controller 123 as shown in FIG. 1E. The I/O controller may control one or more I/O devices such as a keyboard 126 and a pointing device 127, e.g., a mouse or optical pen. Furthermore, an I/O device may also provide storage 128 and/or an installation medium 116 for the computing device 100. In still other embodiments, the computing device 100 may provide USB connections to receive handheld USB storage devices such as the USB Flash Drive line of devices manufactured by Twintech Industry, Inc. of Los Alamitos, Calif.

In some embodiments, the computing device 100 may comprise or be connected to multiple display devices 124a-124n, which each may be of the same or different type and/or form. As such, any of the I/O devices 130a-130n and/or the I/O controller 123 may comprise any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may comprise multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices, such as computing devices 100a and 100b connected to the computing device 100, for example, via a network. These embodiments may include any type of software designed and constructed to use another computer's display device as a second display device 124a for the computing device 100. One ordinarily skilled in the art will recognize and appreciate the various ways and embodiments that a computing device 100 may be configured to have multiple display devices 124a-124n.

In further embodiments, an I/O device 130 may be a bridge 170 between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

A computing device 100 of the sort depicted in FIGS. 1E and 1F typically operate under the control of operating systems, which control scheduling of tasks and access to system resources. The computing device 100 can be running any operating system such as any of the versions of the Microsoft® Windows operating systems, the different releases of the Unix and Linux operating systems, any version of the Mac OS® for Macintosh computers, any embedded operating system, any real-time operating system, any open source operating system, any proprietary operating system, any operating systems for mobile computing devices, or any other operating system capable of running on the computing device and performing the operations described herein. Typical operating systems include: WINDOWS 3.x, WINDOWS 95, WINDOWS 98, WINDOWS 2000, WINDOWS NT 3.51, WINDOWS NT 4.0, WINDOWS CE, and WINDOWS XP, all of which are manufactured by Microsoft Corporation of Redmond, Wash.; MacOS, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, or any type and/or form of a Unix operating system, among others.

In other embodiments, the computing device 100 may have different processors, operating systems, and input devices consistent with the device. For example, in one embodiment the computer 100 is a Treo 180, 270, 1060, 600 or 650 smart phone manufactured by Palm, Inc. In this embodiment, the Treo smart phone is operated under the control of the PalmOS operating system and includes a stylus input device as well as a five-way navigator device. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

As shown in FIG. 1F, the computing device 100 may comprise multiple processors and may provide functionality for simultaneous execution of instructions or for simultaneous execution of one instruction on more than one piece of data. In some embodiments, the computing device 100 may comprise a parallel processor with one or more cores. In one of these embodiments, the computing device 100 is a shared memory parallel device, with multiple processors and/or multiple processor cores, accessing all available memory as a single global address space. In another of these embodiments, the computing device 100 is a distributed memory parallel device with multiple processors each accessing local memory only. In still another of these embodiments, the computing device 100 has both some memory which is shared and some memory which can only be accessed by particular processors or subsets of processors. In still even another of these embodiments, the computing device 100, such as a multi-core microprocessor, combines two or more independent processors into a single package, often a single integrated circuit (IC). In yet another of these embodiments, the computing device 100 includes a chip having a CELL BROADBAND ENGINE architecture and including a Power processor element and a plurality of synergistic processing elements, the Power processor element and the plurality of synergistic processing elements linked together by an internal high speed bus, which may be referred to as an element interconnect bus.

In some embodiments, the processors provide functionality for execution of a single instruction simultaneously on multiple pieces of data (SIMD). In other embodiments, the processors provide functionality for execution of multiple instructions simultaneously on multiple pieces of data (MIMD). In still other embodiments, the processor may use any combination of SIMD and MIMD cores in a single device.

In some embodiments, the computing device 100 may comprise a graphics processing unit. In one of these embodiments, depicted in FIG. 1F, the computing device 100 includes at least one central processing unit 101 and at least one graphics processing unit. In another of these embodiments, the computing device 100 includes at least one parallel processing unit and at least one graphics processing unit. In still another of these embodiments, the computing device 100 includes a plurality of processing units of any type, one of the plurality of processing units comprising a graphics processing unit.

In some embodiments, a first computing device 100a executes an application on behalf of a user of a client computing device 100b. In other embodiments, a computing device 100a executes a virtual machine, which provides an execution session within which applications execute on behalf of a user or a client computing devices 100b. In one of these embodiments, the execution session is a hosted desktop session. In another of these embodiments, the computing device 100 executes a terminal services session. The terminal services session may provide a hosted desktop environment. In still another of these embodiments, the execution session provides access to a computing environment, which may comprise one or more of: an application, a plurality of applications, a desktop application, and a desktop session in which one or more applications may execute.

B. Systems and Methods for Performing Dual DNS Lookup to Detect Public Versus Intranet.

The present disclosure is directed towards systems and methods for performing dual domain name system (DNS) lookups to detect whether a request from an in-application browser is for a public site versus an intranet site on a private network. A hosted application can be installed on a client device, such as a mobile device, that can establish a secure connection to a server on a private company network office intranet using a tunnel connection. Once the secure connection is established, the hosted application may limit the HTTP traffic on the secure connection to only those requests for applications, files, or intranet sites on the private network and redirect request for public sites to a different browser not within the hosted application.

In some embodiments, a user can connect to the private company network through the hosted application installed on the client device to access applications, files, remote desktops, or sites on the private network. The user may enter a request for a web page using an application browser within the hosted application by entering a URL into the application browser. The hosted application can intercept the request for the web page and determine if the request is for a public site or if the request is for an intranet such as a site on the private company network. The requests for public sites can be redirected by the hosted application to a different browser on the client device, not within the hosted application. The requests for intranet sites or other information on the private network can be communicated to a server on the private company network using the secure tunnel connection. The traffic on the secure tunnel connection can be limited, filtered, or monitored to allow only those requests for information on the private network. If a user attempts to access a public site using the hosted application, the user will be redirected to a different browser on the client device that can access the public site without using the secure tunnel connection.

Figure 2A:
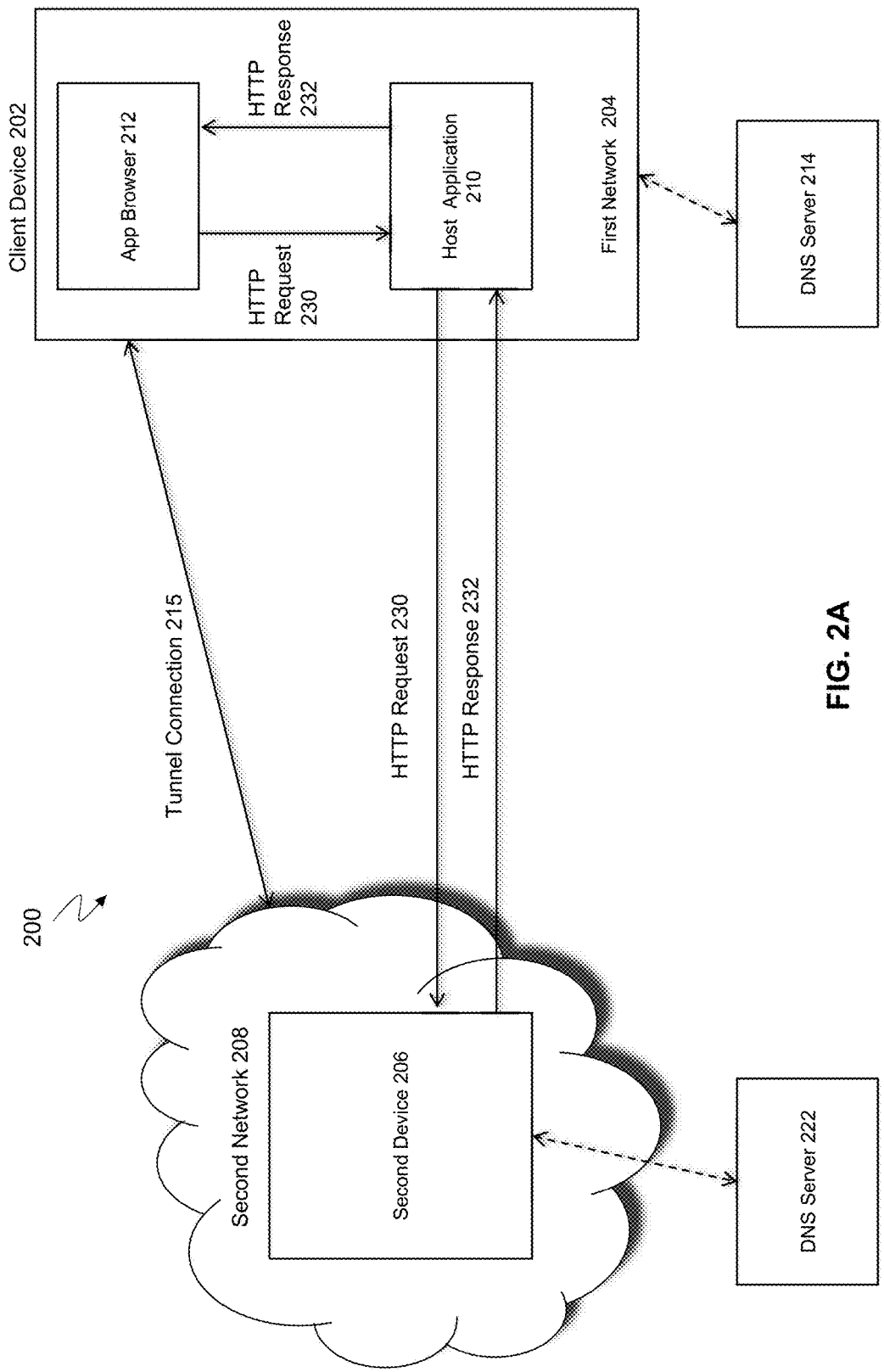
FIG. 2A is a block diagram of an embodiment of a system performing dual DNS lookup to detect whether a request from an in-application browser is for a public site versus an intranet site on a private network.

Now referring to FIG. 2A, a system for performing dual DNS lookup to detect public versus intranet is depicted. The system 200 includes a client device 202 executing on a first network 204 and in communication with a second device 206 executing on a second network 208. The client device includes a hosted application 210 and an application browser 212. The second device 206 may be a server or remote computer connected to the second network 208. In some embodiments, the first network 204 is a public network. For example, the first network 204 may be a local area network (LAN), wide area network (WAN), such as the Internet or the World Wide Web, or a home area network (HAN). The first network 204 may be a 3G network or a 4G network. In embodiment, the first network 204 is the same and operates similar to the network 104, 104' as described above with respect to FIG. 1A. In some embodiments, the second network 208 is a private network or a corporate local area network (LAN). For example, the second network may be an office network, school network, or any restricted computer network that interconnects computing devices based on various restrictions and privacy measures. In an embodiment, the second network 208 is the same and operates similar to the network 104, 104' as described above with respect to FIG. 1A. In an embodiment, the first network 204 is a different network than the second network 208.

In some embodiments, the second device 206 is a server and may be referred to as a file server, application server, web server, proxy server, or gateway server. The second device 206 can be connected to a private network, such as the second network 208, and provide access to a plurality of intranet sites in the second network 208. The second device 206 may include a remote computer, a remote desktop, or a plurality of remote computers or remote desktops. In some embodiments, the remote computer may be part of a corporate LAN. In an embodiment, the second device 206 is the same or similar to the server 106 described above in FIGS. 1A-1H.

The client device 202 may be any form of computing device, workstation, desktop computer, laptop or notebook computer, server, handheld computer, mobile telephone, smartphone, tablet computing device, any other computer, or other form of computing or telecommunications device that is capable of communication and that has sufficient processor power and memory capacity to perform the operations described herein. In an embodiment, the client device 202 may be the same as and operate the same as the client 102 described above with respect to FIGS. 1A-1H.

In some embodiments, the client device 202 includes the hosted application 210. The hosted application 210 may be an application that provides remote intranet access for the client device 202 to applications or remote desktops on the second device 206 on the second network 208. In some embodiments, the hosted application 210 is a software program installed on the client device 202. The hosted application 210 may provide access to the private network or corporate LAN (e.g., second network 208) and intranet sites on the private network or corporate LAN.

In some embodiments, the hosted application 210 is an operating system for mobile devices, such as an iPhone OS (IOS) application. The hosted application 210 may provide secure access to application's, documents, and files stored on the second device 206. In an embodiment, the hosted application 210 monitors a desktop executing on the second device 206 and displays the most recent files worked on, enabling users to access and edit those files on native desktop applications of the client device 202 while on the private network (e.g., business network, second network 208).

In some embodiments, the hosted application 210 is configured to receive web page content from the second device 206 on the second network 208 via a tunnel connection 215. The web page content may identify intranet sites on the second network. The hosted application 210 can be configured to establish a secure connection (e.g., the tunnel connection 215) to the second device 206. In an embodiment, the tunnel connection 215 is a secure connection. The tunnel connection 215 may be a secure transport layer connection for the client device 202 to the second device 206 and the second network 208. In some embodiments, the tunnel connection 215 is any form of secure communications channel between the client device 202 and the second device 206.

In some embodiments, the hosted application 210 is configured to intercept a request 230 on the client device 202 to access an intranet site on the second network 208 identified by the web page content. The request 230 may be an HTTP request to access an internet site on the first network 204 or an intranet site on the second network 208. The hosted application may trap or intercept requests 230 made using the application browser 212. In some embodiments, the application browser 212 is an in-application browser executing on the client device 202 and within the hosted application 210. The application browser 212 may be an intranet browser and provide access to intranet sites on the second network 208 via the tunnel connection 215 established by the hosted application 210 to the second network 208. For example, when a user enters a uniform resource locator (URL) or any address of a web page into the application browser 212, the hosted application 210 may trap or intercept the request 230 for the corresponding web page.

In some embodiments, the hosted application 210 is configured to perform a first IP address resolution of a first DNS lookup of sites on the first network 204. The hosted application 210 may access a first DNS server 214 and query the first DNS server 214 for an IP address corresponding to the request 230. The first DNS server 214 may be executing on the first network 204 and include information (e.g., IP addresses) on intranet sites of the first network 208. In some embodiments, the hosted application 210 determines that the request 230 does not correspond to at least one site or any sites on the first network 208 based on the information in the first DNS server 214.

In some embodiments, the hosted application is configured to transmit the request 230 to the second device 206 on the second network 208 via the tunnel connection 215. The second device 206 can be configured to perform a second IP address resolution of the second DNS lookup on the second network 208 using the request 230. The second device 206 may access a second DNS server 222 and query the second DNS server 222 for an IP address corresponding to the request 230. The second DNS server 222 may be executing on the second network 208 and include information (e.g., IP addresses) on intranet sites of the second network 208.

In some embodiments, the hosted application 210 is configured to receive the second IP address resolution of the second DNS lookup performed by the second device 206 on the second network 208 via the tunnel connection 215. The second device 206 can be configured to transmit a response 232 to the hosted application 210. In an embodiment, the response is an HTTP response. The response 232 may include the second IP address resolution of the second DNS lookup performed by the second device 206 on the second network 208. In some embodiments, the response 232 includes web page content identifying intranet sites on the second network 208. The hosted application 210 can compare the results of the first IP address resolution to the results of the second IP resolution.

In some embodiments, the hosted application 210 is configured to communicate the intercepted request via the tunnel connection 215 to the second device 206 on the second network 208 responsive to determining that the first IP address resolution is different than the second IP address resolution. The hosted application can be configured to provide access for the application browser 212 on the client device 202 to an intranet website on the second network 208 using the tunnel connection 215. The intranet website may correspond to the request 230.

In some embodiments, the hosted application 210 is configured to intercept a second request 230 from the application browser 212 executing on the client device 202 and within the hosted application 210. The hosted application 210 can perform a third IP address resolution of a third DNS lookup of sites on the first network 204 based on the second request 230. The hosted application 210 can be configured to receive a fourth IP address resolution of a fourth DNS lookup performed by the second device 206 on the second network 208 via the tunnel connection 215 based on the second request 230. In some embodiments, the hosted application 210 can be configured to compare results of the third IP address resolution to results of the fourth IP resolution. The hosted application 210 may determine that the results of the third IP address resolution matches the results of the fourth IP resolution. For example, the third IP address resolution and the fourth IP resolution may return the same IP address.

In some embodiments, the hosted application 210 can be configured to redirect the second request 230 to a browser executing on the client device 202 and not through the hosted application 210 responsive to determining that the results of the third IP address resolution matches the results of the fourth IP resolution. For example, the hosted application 210 may redirect the second request 230 to a browser on the client device 202 that accesses the public internet or an external site (e.g. different than the second network 208) using the network interface card (NIC) of the client device 202 or a Wifi adapter of the client device 202. In an embodiment, the hosted application 210 may redirect the second request 230 so a connection to a web page corresponding to the second request 230 is not established using the tunnel connection 215 to the second device 206.

Figure 2B:
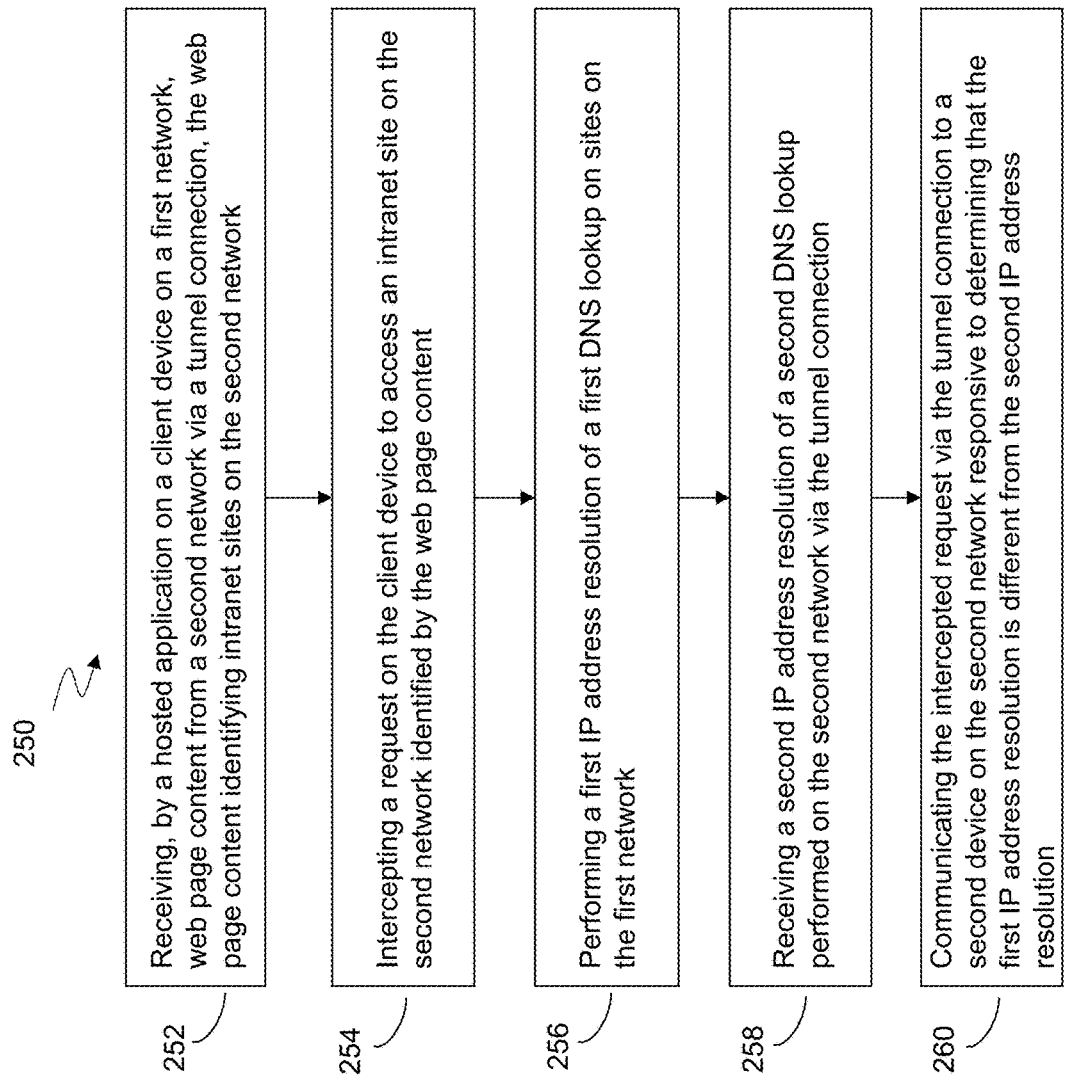
FIG. 2B depicts a flow diagram of a method for performing dual DNS lookup to detect whether a request from an in-application browser is for a public site versus an intranet site on a private network.

Now referring to FIG. 2B, a flow diagram of a method 250 for performing dual DNS lookup to detect public versus intranet. In brief overview, at step 252, the method includes a hosted application executing on a client device on a first network receiving web page content from a second network via a tunnel connection. The web page content may identify intranet sites on the second network. At step 254, the hosted application intercepts a request on the client device to access an intranet site on the second network identified by the web page content. At step 256, the hosted application performs a first IP address resolution of a first DNS lookup on sites on the first network. At step 258, the hosted application receives a second IP address resolution of a second DNS lookup performed on the second network via the tunnel connection. At step 260, the hosted application communicates the intercepted request via the tunnel connection to a second device on the second network responsive to determining that the first IP address resolution is different from the second IP address resolution.

At step 252, the method includes a hosted application executing on a client device on a first network receiving web page content from a second network via a tunnel connection. The web page content may identify intranet sites on the second network. In some embodiments, the hosted application establishes a secure connection to a second device on the second network using the tunnel connection. The second network may be a private network, such as a company, employer, office, or any form of a private intranet. The secure connection may enable the hosted application on the client device to securely access the company intranet.

The hosted application may establish a tunnel connection to the second device or the second network via the second device. In some embodiments, the hosted application includes software installed on the client device. The hosted application can establish an outbound connection via a secure channel to the second device and bypass any firewalls that the second device has established. The hosted application can include an application browser that can access intranet sites on the second network using the secure channel. In some embodiments, the hosted application only provides access to the intranet sites on the second network using the application browser. The hosted application can prevent browsers executing on the client device but not within the hosted application from accessing intranet sites on the second network.

In some embodiments, the hosted application receives content from the second device on the second network that identifies intranet sites on the second network. The content can be received responsive to establishing the secure connection. In some embodiments, the hosted application transmits a request to the second device for the intranet site information. In other embodiments, the hosted application receives the content from the second device periodically or in predetermined time periods. For example, the second device may transmit the intranet site content every five minutes to keep the information at the hosted application on the client device current. The predetermined time period may be any time period. In some embodiments, the content is received responsive to a request made from the hosted application browser on the client device to access a web page.

At step 254, the hosted application intercepts a request on the client device to access an intranet site on the second network identified by the web page content. In some embodiments, the request is an HTTP request. The hosted application may trap requests made from an application browser executing on the client device and within the hosted application (e.g., hosted application browser). The hosted application may transmit the request to the second device on the second network via the tunnel connection. In some embodiments, the hosted application may modify the request prior to transmitting the request to the second device on the second network. The request may be modified to include an identifier that indicates the request was initiated from the application browser within the hosted application. In some embodiments, the request may be encrypted prior to transmitting to the second device via the tunnel connection.

At step 256, the hosted application performs a first IP address resolution of a first DNS lookup on sites on the first network. The hosted application may perform the first IP address resolution to determine if the request made on the client device is for an intranet site on the second network or for a public/external site. The hosted application may access a DNS server executing on the first network. The DNS server on the first network may include public site information, including IP addresses corresponding to the public network. The hosted application may query the DNS server on the first network using the request or information in the request to identify a corresponding site. In other embodiments, the hosted application may transmit the request to a DNS server that is executing on a remote server, remote from the client device and remote from the second network. In some embodiments, the DNS sever on the remote server may include public site information. The hosted application may receive, from the DNS server, a response indicating an IP address (e.g., first IP address) corresponding to the request. In some embodiments, the hosted application determines that the that the request does not correspond to at least one site on the first network. For example, the hosted application may determine that the request does not correspond or match to any sites on the first network using the DNS lookup.

In some embodiments, the second device performs a second IP address resolution of the second DNS lookup on the second network using the request or information received in the request. The second IP address resolution may be performed responsive to receiving the request from the hosted application on the client device. In one embodiments, the second IP address resolution is performed simultaneously with the first IP address resolution. The second device may perform the second IP address resolution to determine if the request made on the client device is for an intranet site on the second network. The second device may access a DNS server executing on the second network and including intranet information unique to the second network and query the DNS server using the request or information in the request. The second device may receive, from the DNS server on the second network, an IP address (e.g., second IP address) corresponding to the request.

At step 258, the hosted application receives a second IP address resolution of a second DNS lookup performed by the second device on the second network via the tunnel connection. In some embodiments, the second device transmits a response (e.g., HTTP response) to the hosted application that includes the second IP address resolution. The request may include web page content identifying intranet sites on the second network. In some embodiments, the response is modified to include the identifier the hosted application embedded in the request. The response may be encrypted by the second device prior to transmitting to the hosted application.

In some embodiments, the hosted application compares the results of the first IP address resolution of the first DNS lookup to results of the second IP address resolution of the second DNS lookup. Responsive to the comparison, the hosted application can determine if the request is for an external site or an intranet site on the second domain. In an embodiment, if the first IP address resolution matches the second IP address resolution, the hosted application determines that the request is for a public site. For example, in some embodiments, the DNS server on the first network has access to public site information and the DNS server on the second network has access to both intranet site and public site information. If both the first IP address resolution and the second IP address resolution resolve to the same IP address, then the request may be for a public site and not for an intranet site on the second network.

In some embodiments, if the first IP address resolution does not match the second IP address resolution, the first IP address resolution and the second IP address resolution resolve to different IP addresses, the hosted application determines that the request is for an intranet site on the second network. In an embodiment, the first IP address resolution and the second IP address resolution does not match because the DNS server on the first network does not have access to intranet site information on the second network and identifies a different IP address than the DNS server on the second network. In some embodiments, the first IP address resolution does not match the second IP address resolution because the DNS server on the first network does not identify a IP address corresponding to the request or information in the request and cannot resolve the IP address. The hosted application may determine, responsive to the first IP address resolution not identifying a IP address corresponding to the request, that the request is for an intranet site on the second network.

At step 260, the hosted application communicates the intercepted request via the tunnel connection to the second device on the second network responsive to determining that the first IP address resolution is different from the second IP address resolution. In some embodiments, the hosted application determines that the request is for an intranet site on the second network. The hosted application can provide access for an application browser on the client device to the intranet website, corresponding to the request, on the second network using the tunnel connection.

In some embodiments, the hosted application redirects the request responsive to determining that the request is for the external site and at least one site in the results of the first IP address resolution of the first DNS lookup matches at least one site in the results of the second IP address resolution of the second DNS lookup. The hosted application may redirect requests for public sites to avoid using bandwidth on the tunnel connection to the server and save the bandwidth for requests to intranet sites on the second network. For example, HTTP traffic for public sites can be handled locally by the client device using a browser executing on the client device. HTTP traffic for intranet sites on the second network can be handled by the hosted application via the tunnel connection to the server on the second network.

The hosted application can redirect the second request to a browser executing on the client device and not through the hosted application. For example, the client device may use a public Wi-Fi connection to establish a connection for the request via a public or unsecure connection and not through the hosted application executing on the client device. The client device may establish a connection to a web page identified in the second request using the NIC of the client device. In some embodiments, the hosted application can intercept a second request from an application browser executing on the client device and within the hosted application. The hosted application can perform a third IP address resolution of a third DNS lookup of sites on the first network based on the second request. The hosted application receives a fourth IP address resolution of a fourth DNS lookup performed by the second device on the second network via the tunnel connection based on the second request. The second request can be redirected to a browser responsive to the hosted application determining that the second request is for a public site.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

While various embodiments of the methods and systems have been described, these embodiments are exemplary and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the exemplary embodiments and should be defined in accordance with the accompanying claims and their equivalents.

What is claimed:

1. A method for performing dual DNS lookup to detect a request for a public site versus a request for an intranet site, the method comprising:
   receiving, by a hosted application on a client device on a first network, web page content from a second network via a tunnel connection, the web page content identifying intranet sites on the second network;
   intercepting, by the hosted application, a request made from an application browser executing on the client device within the hosted application to access an intranet site on the second network identified by the web page content;
   performing, by the hosted application responsive to intercepting the request, a first IP address resolution of a first DNS lookup of the intranet site on the first network;
   transmitting, by the hosted application, the request to the second device on the second network via the tunnel connection;
   receiving, by the hosted application, a second IP address resolution of a second DNS lookup of the intranet site performed responsive to intercepting the request on the second network via the tunnel connection;
   determining for the request that the first IP address resolution is different from the second IP address resolution;
   providing, by the hosted application, access for the application browser executing on the client device and within the hosted application to the intranet site corresponding to the request on the second network using the tunnel connection; and
   communicating, by the hosted application, the intercepted request via the tunnel connection to a second device on the second network responsive to determining that the first IP address resolution is different from the second IP address resolution.

2. The method of claim 1, further comprising establishing, by the hosted application, a secure connection to the second device on the second network using the tunnel connection.

3. The method of claim 1, further comprising performing, by the second device on the second network, the second IP address resolution of the second DNS lookup on the second network using the request.

4. The method of claim 1, wherein performing the first IP address resolution further comprises determining, by the hosted application, that the request does not correspond to at least one site on the first network.

5. The method of claim 1, further comprising intercepting, by the hosted application, a second request from an application browser executing on the client device and within the hosted application.

6. The method of claim 5, further comprising:
   performing, by the hosted application, a third IP address resolution of a third DNS lookup of sites on the first network based on the second request; and
   receiving, by the hosted application, a fourth IP address resolution of a fourth DNS lookup performed on the second network via the tunnel connection based on the second request.

7. The method of claim 6, further comprising redirecting, by the hosted application, the second request to a browser executing on the client device and not through the hosted application.

8. The method of claim 1, further comprising:
   comparing, by the hosted application, results of the first IP address resolution of the first DNS lookup to results of the second IP address resolution of the second DNS lookup,
   determining, by the hosted application, whether the request is for an external site or an intranet site on the second domain based on the comparison.

9. The method of claim 8, further comprising:
   determining, by the hosted application, that the request is for an external site and that a plurality of sites in the results of the first IP address resolution of the first DNS lookup matches all sites of a plurality of sites in the results of the second IP address resolution of the second DNS lookup; and
   redirecting, by the hosted application, the request to a browser executing on the client device.

10. The method of claim 8, further comprising:
    determining, by the hosted application, that the request is for the intranet site and that at least one site of a plurality of sites in the results of the first IP address resolution of the first DNS lookup does not match at least one site of a plurality of sites in the results of the second IP address resolution of the second DNS lookup; and
    establishing, by the hosted application, via an application browser executing on the client device and within the hosted application, a connection to the intranet site on the second network responsive to determining that the request is for the intranet site.

11. A system for performing dual DNS lookup to detect a request for a public site versus a request for an intranet site, the system comprising:
   a hosted application executing on a client device on a first network, the hosted application configured to:
      receive web page content from a second network via a tunnel connection, the web page content identifying intranet sites on the second network;
      intercept a request on the client device made from an application browser executing on the client device within the hosted application to access an intranet site on the second network identified by the web page content;
      perform, responsive to intercepting the request, a first IP address resolution of a first DNS lookup of the intranet site on the first network;
      transmit the request to the second device on the second network via the tunnel connection
      receive a second IP address resolution of a second DNS lookup of the intranet site performed, responsive to intercepting the request, on the second network via the tunnel connection;
      determine for the request that the first IP address resolution is different from the second IP address resolution;
      provide access for the application browser executing on the client device and within the hosted application to the intranet site corresponding to the request on the second network using the tunnel connection; and
      communicate the intercepted request via the tunnel connection to a second device on the second network responsive to determining that the first IP address resolution is different from the second IP address resolution.

12. The system of claim 11, wherein the hosted application is configured to establish a secure connection to the second device on the second network using the tunnel connection.

13. The system of claim 11, wherein the second device on the second domain is configured to perform the second IP address resolution of the second DNS lookup on the second network using the request.

14. The system of claim 11, wherein the hosted application is configured to determine that the request does not correspond to at least one site on the first network.

15. The system of claim 11, wherein the hosted application is configured to intercept a second request from an application browser executing on the client device and within the hosted application.

16. The system of claim 15, wherein the hosted application is configured to:
   perform a third IP address resolution of a third DNS lookup of sites on the first network based on the second request;
   receive a fourth IP address resolution of a fourth DNS lookup performed on the second network via the tunnel connection based on the second request; and
   redirect the second request to a browser executing on the client device and not through the hosted application.

* * * * *